United States Patent [19]

Maute

[11] Patent Number: 5,064,152
[45] Date of Patent: Nov. 12, 1991

[54] METHOD OF DETERMINING AND CONTROLLING THE ATTITUDE OF A SPIN-STABILIZED SATELLITE IN AN ELLIPTICAL TRANSFER ORBIT

[75] Inventor: Patrick A. Maute, Valbonne, France

[73] Assignee: Aerospatiale Societe Nationale Industrielle, Paris, France

[21] Appl. No.: 446,254

[22] Filed: Dec. 5, 1989

[30] Foreign Application Priority Data

Dec. 23, 1988 [FR] France ................. 8817120

[51] Int. Cl.$^5$ ............................................. B64G 1/24
[52] U.S. Cl. .................................. 244/164; 244/169; 364/434
[58] Field of Search ............. 244/164, 169, 3.21; 364/434

[56] References Cited

U.S. PATENT DOCUMENTS 4,776,540 10/1988 Westerlund ................. 244/164
4,837,699 6/1989 Smay et al. ................. 244/169 X

FOREIGN PATENT DOCUMENTS 0209429 1/1987 European Pat. Off. .
2373823 7/1978 France .

OTHER PUBLICATIONS

"Attitude Determination Covariance Analysis for Geostationary Transfer Orbits", Jozef C. Van der Ha; Senior Analyst, Orbit Attitude Div.; European Space Operations Centre ESA, Darmstadt, FRG; 169A Journal of Guidance Control, and Dyanmics 9 (1986) Mar.-Apr., No. 2, Broadway, N.Y.; pp. 156-163.

Primary Examiner—Mark Hellner
Attorney, Agent, or Firm—Browdy and Neimark

[57] ABSTRACT

The attitude of a satellite carrying terrestrial and solar sensors and spin-stabilized about an axis V—V is determined and controlled prior to its transfer from an elliptical transfer orbit to a circular geostationary orbit by means of an apogee motor firing. The attitude is defined relative to an inertial X-Y-Z frame of reference the Z axis of which is directed towards geographical North, by a declination $\alpha$ between the axis V—V and the X-Y plane and by a right ascension $\beta$ between the projection of the axis V—V onto the X-Y plane and the X axis. After injection of the satellite by a launch vehicle into the transfer orbit at its perigee, with an initial attitude approximating the predetermined final attitude for the apogee motor firing, the right ascension $\beta$ of the satellite is modified to confer on it an intermediate attitude such that the earth is in the field of view of the terrestrial sensors for a position of the satellite in the transfer orbit offset at least 10° from the apogee. The declination $\alpha$ of the rotation axis of the satellite is measured and then adjusted to the value required for the apogee motor firing. Maintaining this declination constant, the right ascension is adjusted on the basis of the solar sensor measurements so as to bring the satellite into its final attitude, and the apogee motor firing is then commanded.

10 Claims, 5 Drawing Sheets

METHOD OF DETERMINING AND CONTROLLING THE ATTITUDE OF A SPIN-STABILIZED SATELLITE IN AN ELLIPTICAL TRANSFER ORBIT

BACKGROUND OF THE INVENTION

1. Field of the invention

The invention concerns determining and controlling the attitude of a spin-stabilized satellite before it is transferred from an elliptical transfer orbit to a circular geostationary orbit by means of an apogee motor firing (AMF).

2. Description of the prior art

A satellite to be placed in a geostationary orbit is first launched from the ground by a launch vehicle such as the ARIANE rocket, for example, adapted to inject the satellite into an elliptical transfer orbit the perigee of which is at an altitude in the order of 200 km and the apogee of which is substantially at the altitude of the intended geostationary orbit (in the order of 36,000 kilometers). Then, when the satellite is passing through the apogee of the transfer orbit, an apogee motor firing is commanded during which an apogee motor on the satellite applies to it an impulse thrust with an orientation and amplitude adapted to transfer it substantially to its geostationary orbit.

At present a distinction is drawn between two types of launch procedure according to whether, when in the transfer orbit, the satellite is three-axis stabilized or spin-stabilized (rotates on itself) about an axis which is in practise the thrust axis of its apogee motor.

In the former case the orientation (or attitude) of the satellite is maintained constant, which entails frequent attitude correction maneuvers.

In the latter case, to which the invention relates, the orientation in space of the rotation axis of the satellite (here reference is also made to the "attitude" of the spinning satellite) varies only slightly along the transfer orbit. In practise, when the satellite is deployed by the launch vehicle an attempt is made to approximate as closely as possible the orientation (or attitude) required for firing the apogee motor and only slight attitude corrections are then made while the satellite is in its transfer orbit for fine adjustment of the actual attitude to the required attitude.

This orientation of the thrust axis is substantially perpendicular to the major axis of the elliptical transfer orbit.

It will be readily understood that the satellite can only be injected correctly into its geostationary orbit if, prior to the apogee motor firing, the thrust axis has been accurately oriented as required, failing which subsequent corrections which use up fuel will be necessary to reach the required orbit as well as can be achieved, which will reduce the residual quantity of fuel and therefore the service life of the satellite.

The orientation in space of the thrust axis (and therefore the attitude of the satellite) is determined by means of a set of terrestrial and solar sensors disposed on the satellite in an appropriate arrangement and the orientation is controlled and adjusted by thrusters provided on the satellite.

The solar and terrestrial sensors provide measurements of the angular offset between the direction in which they "see" the sun or the earth, respectively, and reference directions relating to the sensors. The determination of the orientation in space of an axis such as the thrust axis then follows preliminary recognition of the satellite-earth-sun plane.

Solar sensors are adapted to provide successive measurements throughout the transfer orbit except during periods of eclipse; as these are of limited duration and generally correspond to areas in the vicinity of the perigee, this is not disadvantageous.

Because of their positioning on the satellite relative to the thrust axis and because of their narrow field of view ($\pm 1°$ approximately), the terrestrial sensors are adapted to provide measurements over only a limited part of the transfer orbit in the vicinity of the apogee (and also in the vicinity of the perigee), where the earth actually enters the field of view of the terrestrial sensors, given the orientation in space of the satellite rotation axis (perpendicular to the major axis of the orbit).

A major difficultly in adjusting the attitude of the spinning satellite on initiating the apogee motor firing results from the fact that the satellite is usually at this time very near an imaginary line joining the earth and the sun. The result of this is significant uncertainty in the determination of the satellite-earth-sun plane and therefore in the determination of the orientation of the thrust axis.

This virtual alignment of the satellite between the earth and the sun at the time of the apogee motor firing results from the fact that satellite operators demand, for most currently available launch vehicles, and especially those designed to launch two satellites at one time, very narrow launch windows usually around midnight universal time. For the ARIANE rocket, for example, this launch window has a duration of 45 minutes and, depending on the launch date, ends at a time between 23 h 35 and 0 h 20.

The attitude of a spinning satellite before the apogee motor firing can therefore at present be determined only in the immediate vicinity of the apogee (given the positioning of the terrestrial sensors), in a satellite-earth-sun configuration that does not favor accurate measurement (because of the launch windows).

This state of affairs has led to various compromises or palliative measures being proposed:
  seeking a derogation in respect of the launch procedures to avoid the times of year in which the launch window constraints are the most severe (equinoxes); the result of this is considerably reduced flexibility of use of the launch vehicle;
  accepting poor accuracy of attitude determination at the time of the apogee motor firing, at the cost of reducing the service life of the satellite;
  providing the satellite with additional terrestrial sensors positioned so that the earth lies in their field of view elsewhere than at the apogee of the transfer orbit; as these additional terrestrial sensors are used only during the transfer phase they represent a penalty in terms of cost and weight that is of no utility during the satellite's useful service life.

An object of the invention is to alleviate these disadvantages by enabling accurate determination of the attitude of a spin-stabilized satellite before the apogee motor firing without any significant penalty in terms of weight or cost or satellite service life.

SUMMARY OF THE INVENTION

The invention consists in a method of determining and controlling the attitude of a satellite carrying terrestrial and solar sensors and spin-stabilized about an axis V—V prior to its transfer from an elliptical transfer orbit to a circular geostationary orbit by means of an apogee motor firing, the attitude being defined relative to an inertial X-Y-Z frame of reference the Z axis of which is directed towards geographical North, by a declination α between the axis V—V and the X-Y plane and by a right ascension β between the projection of the axis V—V onto the X-Y plane and the X axis, in which method, after injection of the satellite by a launch vehicle into the transfer orbit at its perigee, with an initial attitude approximating the predetermined final attitude for the apogee motor firing:

the right ascension β of the satellite is modified (C) to confer on it an intermediate attitude such that the earth is in the field of view of the terrestrial sensors for a position of the satellite in the transfer orbit offset at least 10° from the apogee of the transfer orbit, the declination α of the rotation axis of the satellite is measured and then adjusted (C') to the value required for the apogee motor firing, maintaining this declination constant, the right ascension is adjusted (D) on the basis of the solar sensor measurements so as to bring the satellite into its final attitude, and the apogee motor firing is commanded.

The invention stems from the fact that the accuracy with which the declination α is determined deteriorates near the earth-satellite-sun alignment while the right ascension β can be determined using only the solar sensor measurements. By virtue of the aforementioned intermediate attitude, the invention makes it possible to measure the declination precisely as the terrestrial sensor measurements are obtained on a part of the orbit where the satellite is not aligned with the earth and the sun.

Preferred features of the invention, some of which may be combined with each other, are as follows:

the right ascension β differential between the initial attitude and the intermediate attitude is between 0°–1° and 20°, preferably around 10°;

in the intermediate attitude, the position of the satellite when the earth is in the field of view of the terrestrial sensors is approximately 10° to 30° ahead of the apogee;

the apogee motor firing being scheduled for the fourth passage of the satellite through the apogee of the transfer orbit, the satellite is brought into its intermediate attitude before it passes the second time through the apogee of the transfer orbit;

the satellite is brought into its intermediate attitude at a position of the satellite on its transfer orbit between 170° and 10° ahead of the apogee of the transfer orbit;

the declination α of the satellite is adjusted at a position between 10° and 30° ahead of the apogee of the transfer orbit;

the apogee motor firing being scheduled for the fourth passage of the satellite through the apogee of its transfer orbit, the declination α is adjusted before the satellite passes the second time through the apogee of its transfer orbit;

the satellite is brought into its final attitude (C) at a position of the satellite on the transfer orbit between 10° and 30° ahead of the apogee of the transfer orbit;

the apogee motor firing being scheduled for the fourth passage of the satellite through the apogee of its transfer orbit, the satellite is brought into its final attitude (D) before it passes the third time through the apogee of its transfer orbit;

the apogee motor firing being scheduled for the fourth passage of the satellite through the apogee of its transfer orbit, a final adjustment (E) of the right ascension β is commanded between 30° and 10° ahead of this fourth passage through the apogee of the transfer orbit.

Objects, characteristics and advantages of the invention will emerge from the following description given by way of non-limiting example only and with reference to the appended diagrammatic drawings.

DETAILED DESCRIPTION OF THE INVENTION

Figure 1:
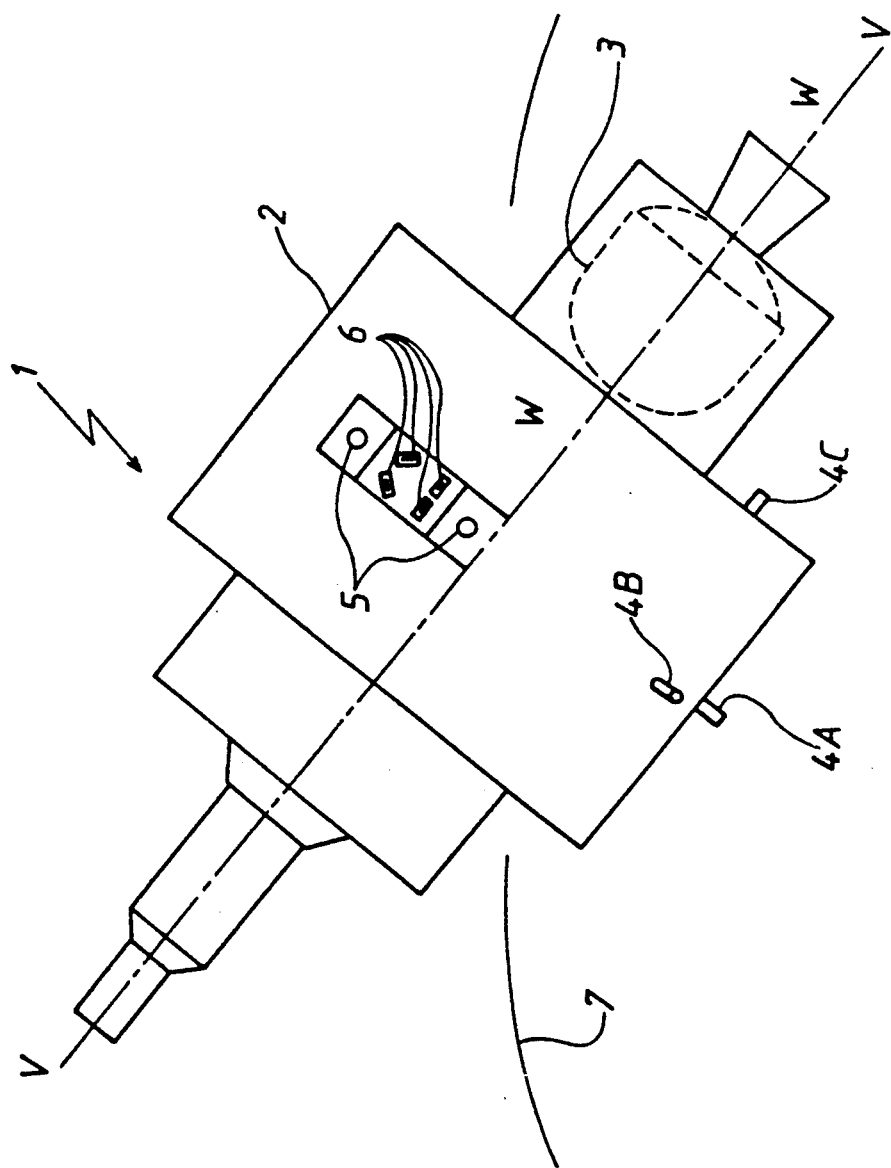
FIG. 1 is a diagrammatic view in elevation of a spin-stabilized satellite in a transfer orbit provided with terrestrial and solar sensors and thrusters enabling the invention to be implemented.

Referring to FIG. 1, the spin-stabilized satellite 1 comprises a body 2 rotating continuously at an angular speed ω about a rotation axis V—V advantageously coincident with a longitudinal main inertia axis of the body 2.

The body 2 is provided with an apogee motor 3 the thrust axis W—W of which is coincident with the rotation axis V—V.

Figure 3:
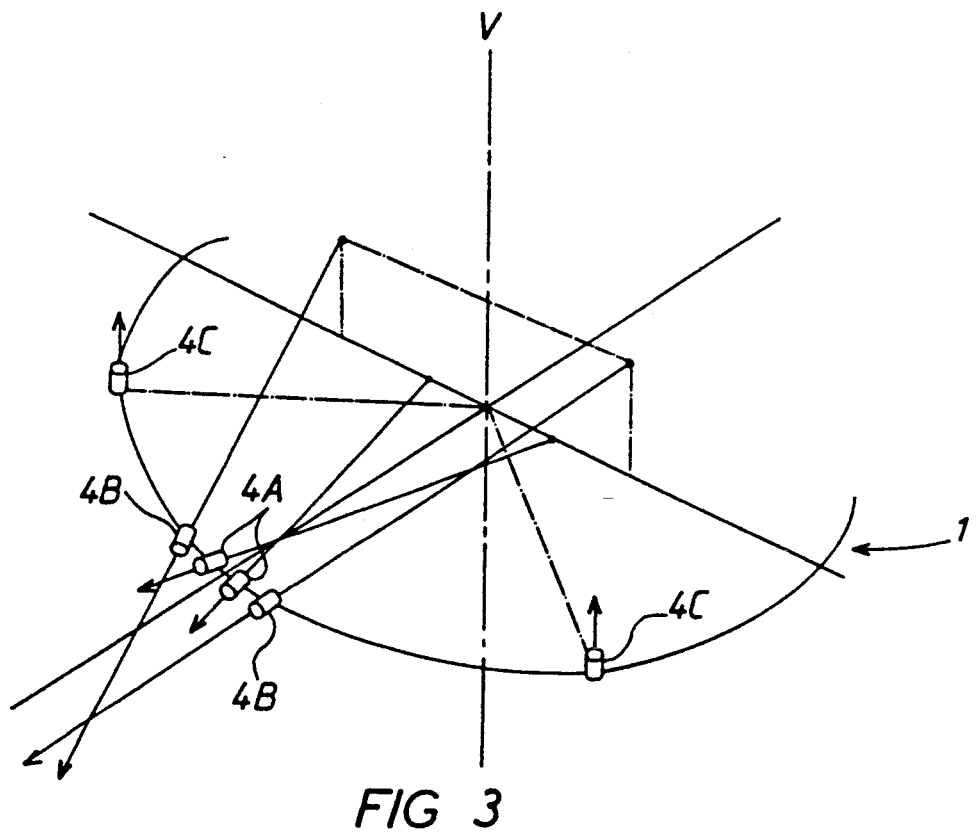
FIG. 3 is a partial schematic view of the arrangement of the reorientation thrusters on the satellite from FIG. 1.

There are further provided on the body 2, in a geometric arrangement that is known in itself, attitude correcting thrusters 4 (see FIG. 3) adapted to apply to the satellite thrusts that are primarily lateral in the case of the radial thrusters 4A and the vernier thrusters 4B or axial in the case of the axial thrusters 4C.

The body 2 further carries a plurality of terrestrial sensors 5 and solar sensors 6 disposed in an arrangement that is known in itself, each adapted to measure the angular offset between the direction in which it "sees" the earth or the sun, respectively, and a reference direction specific to the sensor.

The satellite 1 is in a transfer orbit schematically represented at 7.

Figure 2:
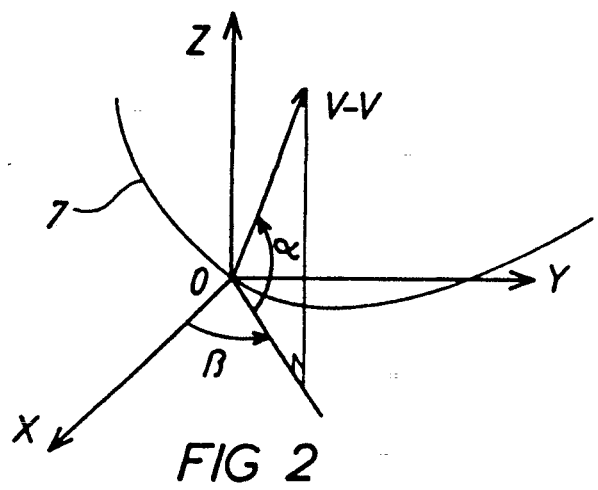
FIG. 2 shows the position of the rotation axis of the satellite in a frame of reference that is fixed in space.

FIG. 2 shows an orthogonal inertial frame of reference OXYZ of fixed orientation in space, the OZ axis of which is oriented towards geographical North. The orientation of the OX and OY axes is defined arbitrarily by convention. The OXY plane is usually coincident with the equatorial plane of the earth.

The term "declination" refers to the angle $\alpha$ in this frame of reference between the rotation axis V—V and the OXY plane. The term "right ascension" refers to the angle $\beta$ between the projection of this axis V—V on the OXY plane and the OX axis.

To clarify the diagram, in FIG. 2 the XYZ frame of reference is shown with the origin 0 at the apogee of the transfer orbit 7 of the satellite 1.

FIGS. 4A, 4B, 5A and 5B show an operation to tilt the rotation axix V—V of the satellite by operating some (4B and 4C) of the correction thrusters 4.

These diagrams show the axis V—V, the sun S, an angle $\theta$ which represents the angular phase between the direction of the sun and the direction in which the pulses of thrust are applied by the reorientation thrusters 4B or 4C, and an angle $\phi$ which represents the angular offset of the axis of the thruster in question between the start of a thrust pulse and the moment a "solar" pulse is emitted by the solar sensor 6 (when it "sees" the sun). The radial arrows represent the direction the axis V—V is tilted and t represents the angle between the thruster and the solar sensor.

Figure 4A:
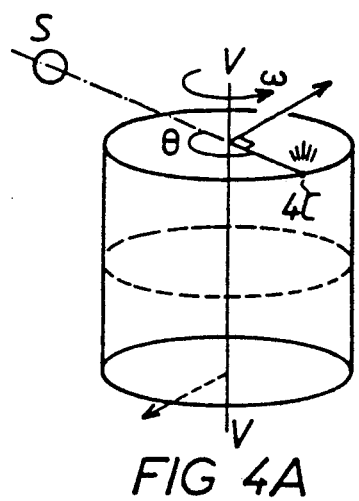
FIGS. 4A and 4B are two simplified geometric representations of the satellite in perspective, respectively corresponding to axial and radial thrusts during an attitude motor firing.
Figure 5A:
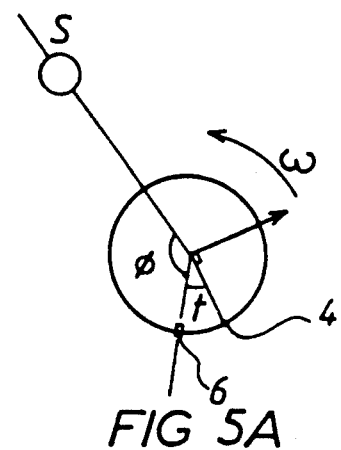
FIGS. 5A and 5B are two projections of these representations onto a plane perpendicular to the rotation axis.
Figure 4B:
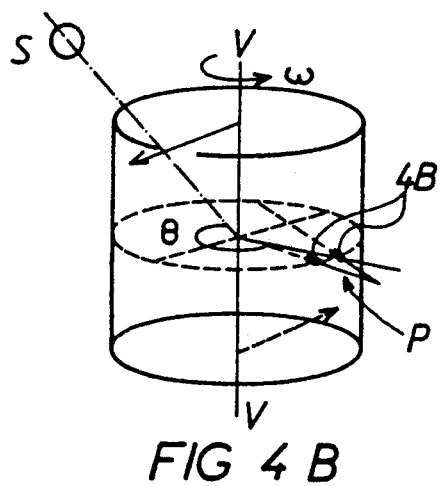
Figure 5B:
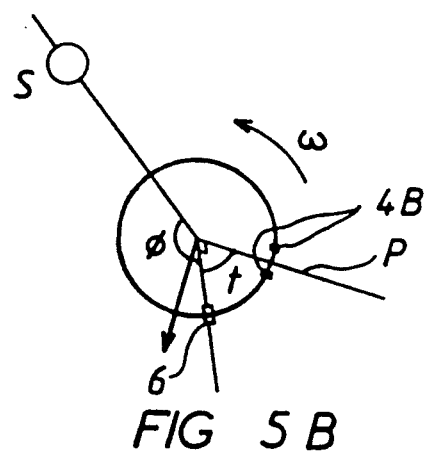

The configuration of FIGS. 4A and 5A is achieved when an axial thrust is applied whereas that of FIGS. 4B and 5B is obtained when lateral thrusts are applied at P by the vernier thrusters 4C.

FIGS. 6A through 6D show the successive phases of controlling and determining the attitude of the spin-stabilized satellite 1 during 3.5 orbits (corresponding to the typical case of a burn at the fourth apogee) performed between deployment and the apogee motor firing.

Each of these figures shows the transfer orbit 7, the direction of the sun S, the earth T and radii centered on the earth defining an angular graduation with steps of 10°. Various successive stages in determining and controlling the attitude of the satellite 1 are identified on the orbit 7 by letters in alphabetical order and a schematic representation of the satellite is associated with several of these to symbolize the corresponding stage.

At A the satellite is injected into the transfer orbit 7 by the launch vehicle, at the perigee of this orbit, in approximately the attitude required for the apogee motor firing.

At a point B on the segment B1-B2, here chosen during the first half-orbit (see FIG. 6A), the various thrusters 4 to be used subsequently to modify the orientation of the rotation axis V—V are calibrated. This calibration is done by modifying the right ascension of the V—V axis and then by applying an opposite modification: the actual tilt as measured by means of the solar sensors 6 is compared with the intended theoretical value.

At a point C on a segment C1-C2, here chosen during the second transfer orbit (see FIG. 6B), tilting of the axis V—V into a predetermined intermediate attitude is commanded. This attitude is previously chosen as being propitious to precise determination of the declination $\alpha$ of the axis V—V. This change of attitude (see FIG. 7) corresponds to simple variation of the right ascension $\beta$ by rotation about the OZ axis.

In this intermediate attitude the earth is in the field of view of the terrestrial sensors 5 throughout the segment C-C2. As this segment is offset relative to the apogee, the terrestrial and solar sensors can precisely measure the declination $\alpha$, being away from the earth-satellite-sun alignment. Then, at the point C' on the segment C-C2, a correction of the declination is commanded (see FIG. 7) so as to confer on it the value required for the apogee motor firing.

Figure 6C:
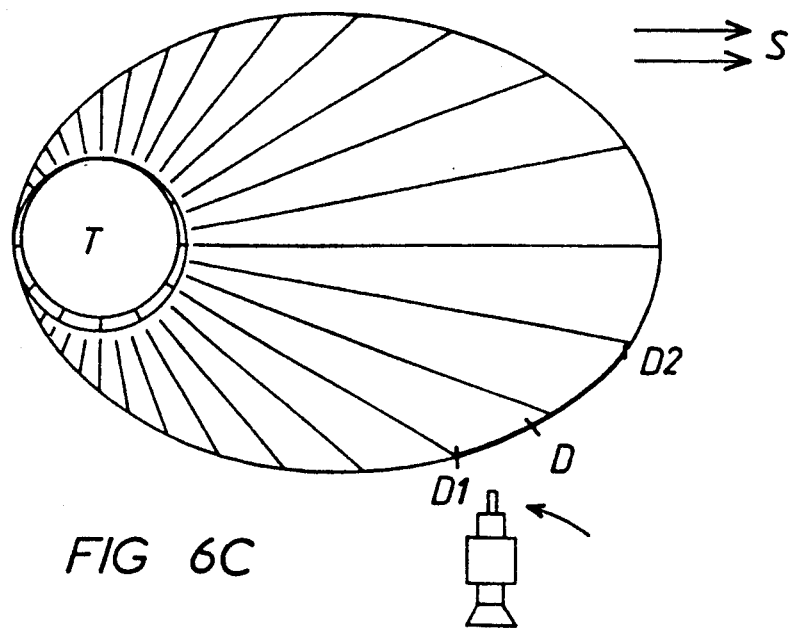
Figure 6D:
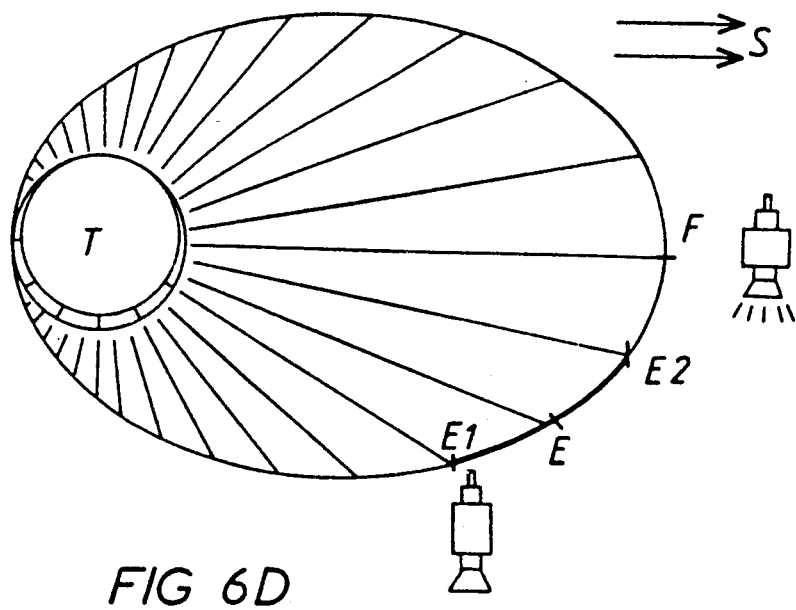
Figure 7:
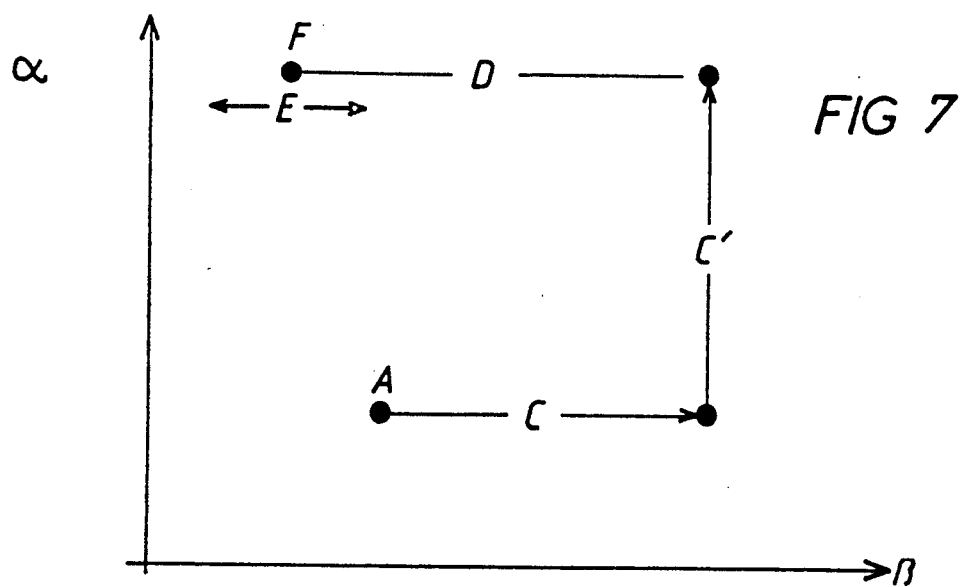
FIG. 7 is a graph of the declination α plotted as a function of the right ascension β corresponding to the main stages of the method of the invention.

At a point D in the segment D1-D2, here chosen during the third orbit (see FIG. 6C), the right ascension $\beta$ of the axis V—V is modified to place the satellite in the attitude required for the apogee motor firing (see FIG. 7). Note that this modification of the right ascension can be observed and therefore controlled by means of the solar sensors alone, and so is not affected by the proximity of the earth-satellite-sun alignment configuration. The declination $\alpha$ cannot be observed accurately after the modification has been carried out at D, but because of the previous calibration of the thrusters it is known how to apply this modification whilst remaining as close as possible to the declination adjusted at C'.

At a point E in a segment E1-E2 chosen in the fourth orbit (see FIG. 6D) before the apogee motor firing the right ascension of the axis V—V can be refined if required or if this would seem to be beneficial, on the basis of measurements obtained from the solar sensors.

The satellite is then in an appropriate attitude for the apogee motor firing at F in the vicinity of the fourth apogee, on the axis W—W coincident with the axis V—V.

The offset $\Delta\beta$ of the right ascension between the target attitude for the apogee motor firing and the intermediate attitude is advantageously between 0°–1° and 20°, for example approximately 10° (between 8° and 12°, for example). The change at C to the intermediate attitude is then carried out between 90° and 180° true anomaly, while the adjustment of $\alpha$ is carried out between 120° and 180° true anomaly; in FIG. 6B the change C and the adjustment C' of declination take place between 30° and 10° ahead of the second apogee.

Figure 6A:
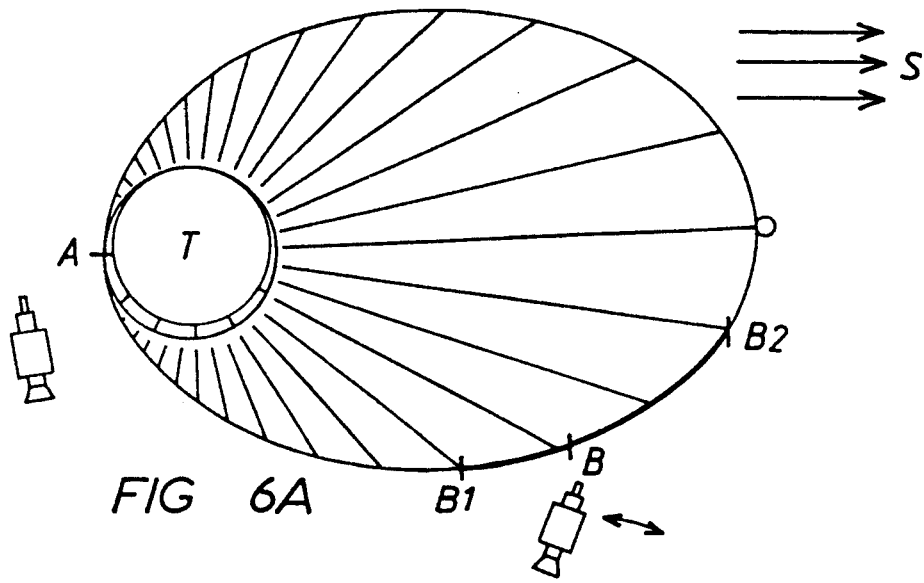
FIGS. 6A through 6D are four views of the transfer orbit showing the successive stages of the method in accordance with the invention during 3.5 orbits by the spin-stabilized satellite between its deployment by the launch vehicle and the apogee motor firing.
Figure 6B:
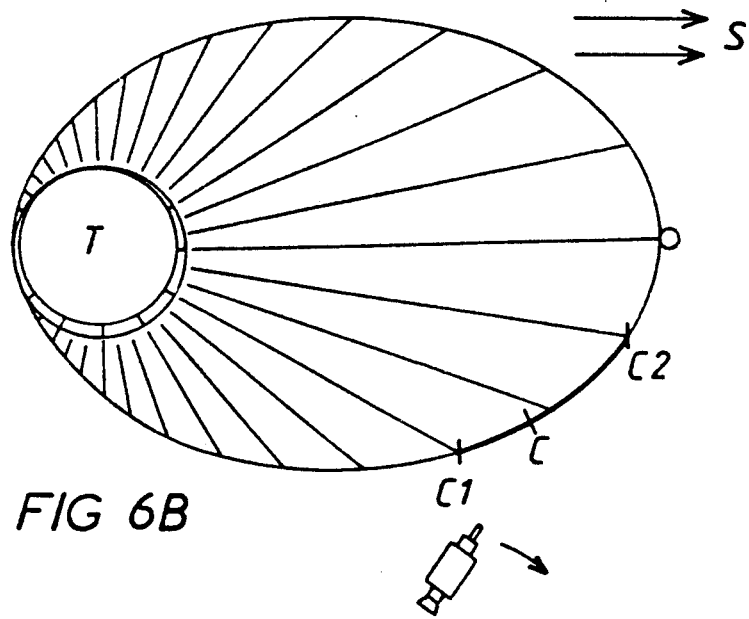

The thrusters B are advantageously calibrated between 90° and 180° true anomaly (in FIG. 6A, between 40° and 10° ahead of the first apogee).

The change at D to the final attitude is advantageously carried out between 120° and 180° true anomaly (in FIG. 6C between 30° and 10° ahead of the third apogee).

The optional final refining at E of the right ascension is advantageously carried out between 30° and 10° ahead of the fourth and final apogee.

It will be noted that in the example described with reference to FIGS. 6A through 6D all the modifications of $\alpha$ and $\beta$ take place just before an apogee. By choosing an offset of $\beta$ in the opposite direction it would be possible to situate at least the stages C and C' after an apogee.

Simulations have shown that the invention can produce the optimum attitude for the apogee motor firing to within ±0.8°.

It goes without saying that the foregoing description has been given by way of non-limiting example only and that numerous variations thereon may be put forward by those skilled in the art without departing from the scope of the invention.

We claim:

1. Method of determining and controlling the attitude of a satellite carrying terrestrial and solar sensors and spin-stabilized about an axis V—V prior to its transfer from an elliptical transfer orbit to a circular geostationary orbit by means of an apogee motor firing, said attitude being defined relative to an inertial X-Y-Z frame of reference the Z axis of which is directed towards geographical North, by a declination α between said axis V—V and the X-Y plane and by a right ascension β between the projection of said axis V—V onto said X-Y plane and the X axis, in which method, after injection of said satellite by a launch vehicle into said transfer orbit at its perigee, with an initial attitude approximating the predetermined final attitude for said apogee motor firing, said right ascension β of said satellite is modified to confer on it an intermediate attitude such that the earth is in the field of view of said terrestrial sensors for a position of said satellite in said transfer orbit offset at least 10° from the apogee of said transfer orbit, the declination α of the rotation axis of said satellite is measured and then adjusted to the value required for said apogee motor firing, maintaining this declination constant, said right ascension is adjusted on the basis of solar sensor measurements so as to bring said satellite into its final attitude, and said apogee motor firing is commanded.

2. Method according to claim 1 wherein the right ascension β differential between said initial attitude and said intermediate attitude is between 1° and 20°.

3. Method according to claim 1 wherein, in said intermediate attitude, the position of said satellite when the earth is in the field of view of said terrestrial sensors is approximately 10° to 30° ahead of the apogee of said transfer orbit.

4. Method according to claim 1 wherein, the apogee motor firing being scheduled for the fourth passage of said satellite through said apogee of said transfer orbit, said satellite is brought into said intermediate attitude before it passes the second time through said apogee of said transfer orbit.

5. Method according to claim 1 wherein said satellite is brought into said intermediate attitude at a position of said satellite on said transfer orbit between 170° and 10° ahead of said apogee of said transfer orbit.

6. Method according to claim 1 wherein said declination α of said satellite is adjusted at a position between 10° and 30° ahead of said apogee of said transfer orbit.

7. Method according to claim 1 wherein, said apogee motor firing being scheduled for the fourth passage of said satellite through said apogee of said transfer orbit, said declination α is adjusted before said satellite passes the second time through said apogee of said transfer orbit.

8. Method according to claim 1 wherein said satellite is brought into its final attitude at a position of said satellite on said transfer orbit between 10° and 30° ahead of said apogee of said transfer orbit.

9. Method according to claim 1 wherein, said apogee motor firing being scheduled for the fourth passage of said satellite through said apogee of said transfer orbit, said satellite is brought into said final attitude before it passes the third time through said apogee of said transfer orbit.

10. Method according to claim 1 wherein, said apogee motor firing being scheduled for the fourth passage of said satellite through said apogee of said transfer orbit, a final adjustment of said right ascension β is commanded between 30° and 10° ahead of said fourth passage through said apogee of said transfer orbit.

* * * * *